United States Patent

[11] 3,575,072

| [72] | Inventors | Derek Alan George Silver;<br>Maurice George Small, Slough, England |
|---|---|---|
| [21] | Appl. No. | 700,107 |
| [22] | Filed | Jan. 24, 1968 |
| [45] | Patented | Apr. 13, 1971 |
| [73] | Assignee | William Owen McKenzie Jones<br>Maidenhead, Berkshire, England |

[54] MACHINE TOOLS
4 Claims, 4 Drawing Figs.

[52] U.S. Cl. .................................................. 82/24,
82/36
[51] Int. Cl. ....................................................... B23b 21/00
[50] Field of Search........................................... 82/24, 25,
35, 32; 29/57

[56] References Cited
UNITED STATES PATENTS
1,856,196  5/1932  Smith et al..................... 82/24

| 3,191,470 | 6/1965 | Pabst et al. ..................... | 82/36 |
|---|---|---|---|
| 3,238,630 | 3/1966 | Jeanneret........................ | 82/24X |
| 3,292,267 | 12/1966 | Wilterdink et al............. | 82/24X |
| 3,333,493 | 8/1967 | Bullard et al. ................. | 82/24X |

FOREIGN PATENTS 423,416  4/1967  Switzerland.................  82/24

*Primary Examiner*—Leonidas Vlachos
*Attorney*—Horton, Davis and McCaleb

ABSTRACT: A male dovetail member mountable at one or more tool operating stations of a multispindle lathe including means for accurately locating, aligning and fixing the same at predetermined positions in relation to fixed parameters of the lathe; the dovetail member having a pair of uninterrupted reference and support surfaces each of which serves to selectively fix removable preset tools and tool holders in predetermined locations with respect to established reference parameters of the lathe.

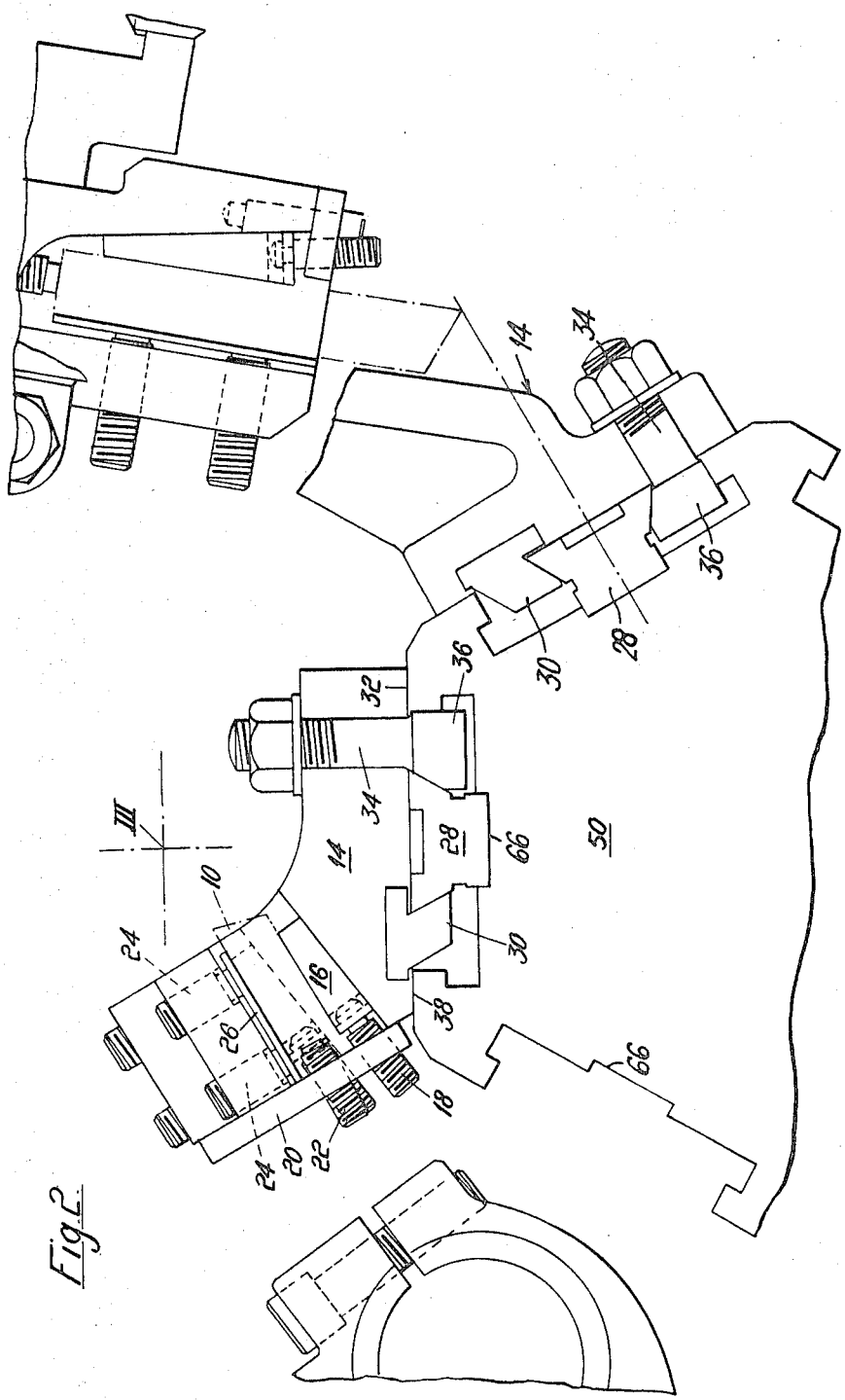

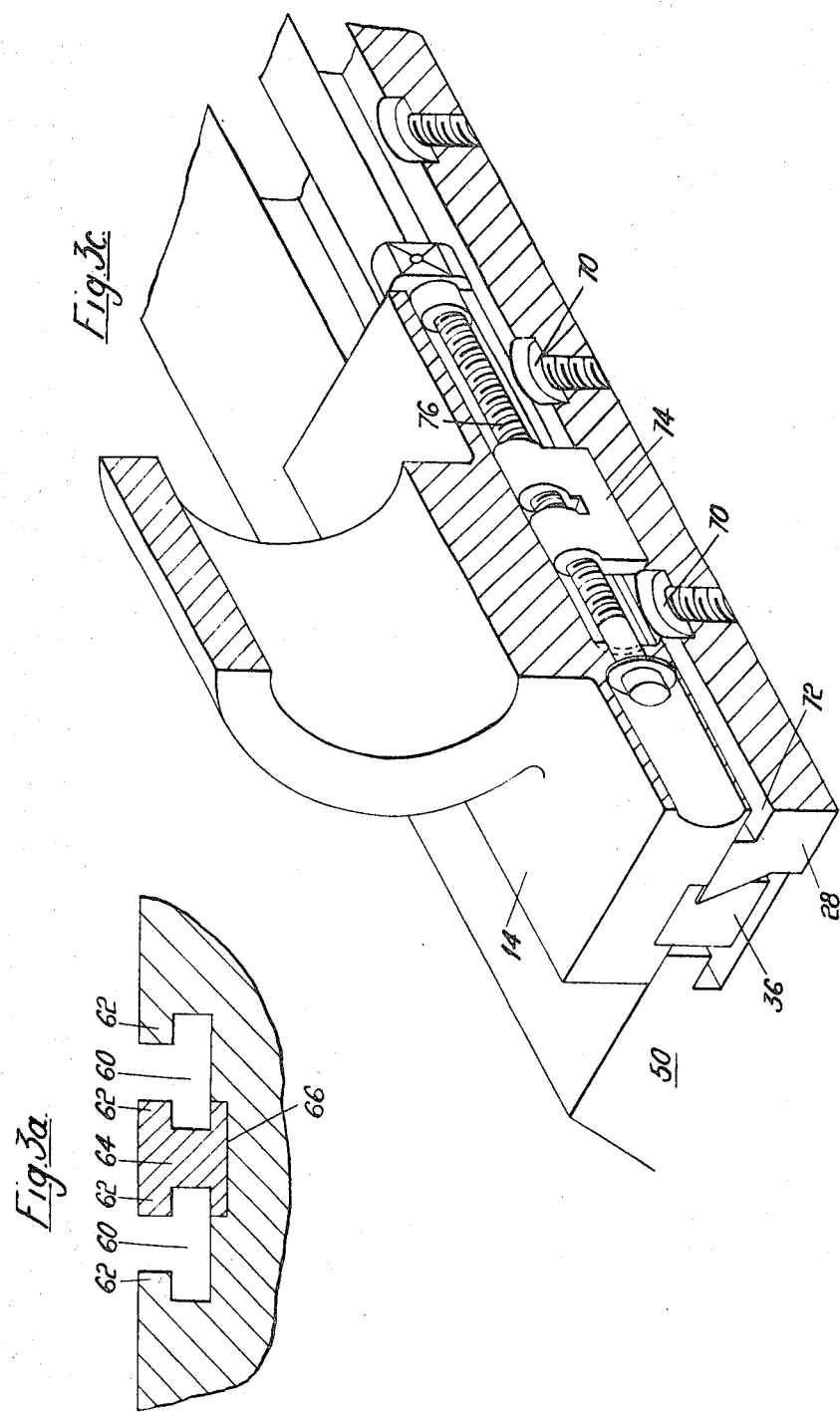

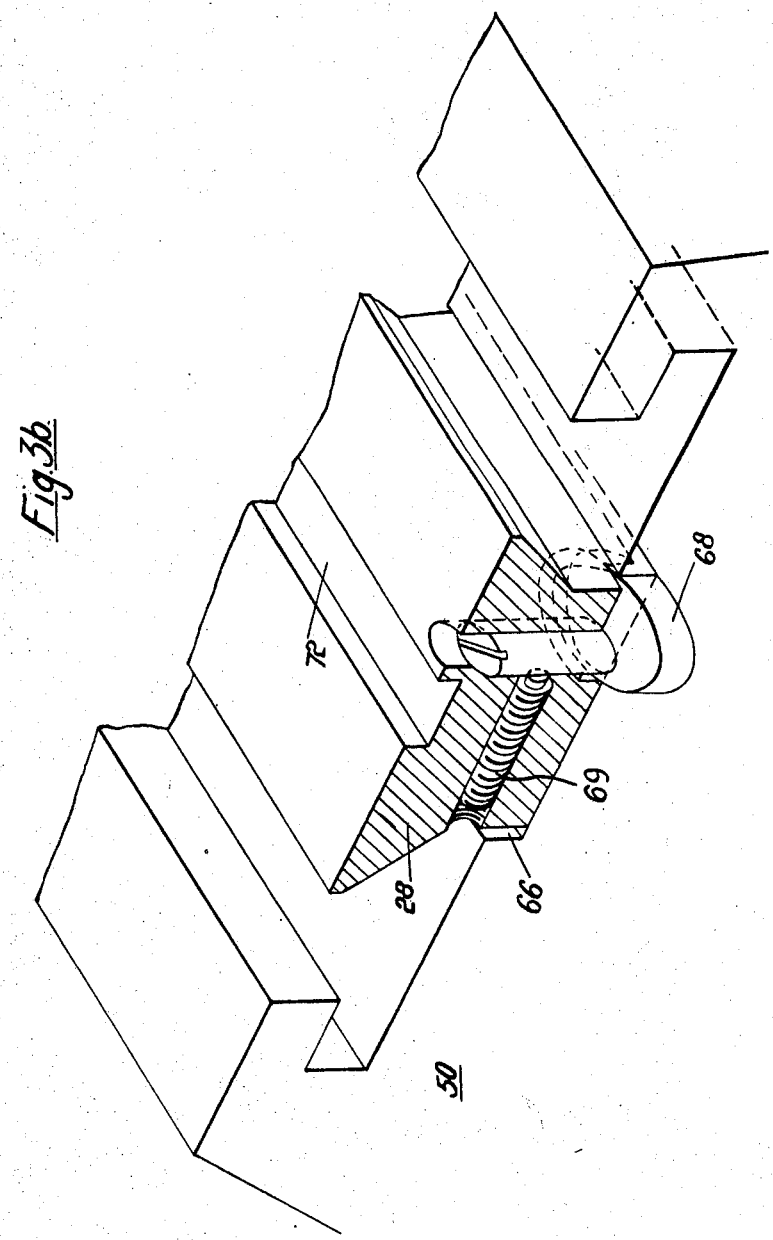

MACHINE TOOLS

This invention relates to machine tools and in particular to apparatus enabling tools to be preset prior to their being mounted on machine tools. Tools which have been accurately set up remote from a machine tool on that on mounting on the machine tool they assume a predetermined position will herein be referred to as "preset" tools.

The specifications of British Pat. No. 921,602 describe arrangements whereby tools may be preset in a tool carrier which is then positively and accurately connected to a mounting block on a machine tool, or directly to the machine tool so that the tool will then be correctly positioned relatively to, for example, the centerline of the chuck and be ready for a machining operation without further setting up on the machine tool.

Although this system has been very successfully applied inter alia to the presetting of tools on turret lathes, the requirement of a mounting block between the tool and the machine tool takes up valuable space which either reduces the capacity of the machine tool and/or can hinder free movement of swarf.

A further disadvantage arises if the mounting on the machine tool is to be used for some tools which are mounted for machining in one direction while other tools have to be mounted to operate in the reverse direction. This is of little or no consequence in the case of a turret lathe either on the cross-slides or on the turret, but in the case of a multispindle lathe wherein the tools may be fitted to operate in either one direction or the other depending upon the direction of rotation of the spindles and the type of the cutting tool to be used, a "reversible" location member is required so that the sideways cutting force in both directions is resisted by a rigid edge of the mounting on the machine tool.

These problems are solved in accordance with the invention by a machine tool having a male dovetail member with two "rigid" (as hereinafter defined) edges or sides provided at one or more tool stations so that a tool or tool holder having a corresponding "rigid" edge or side can be accurately located and clamped with its rigid edge engaging either one or the other "rigid" edge on the male dovetail member. The tool or tool holder preferably has a corresponding female dovetail formed with a rigid edge with clamping means.

A "rigid" side or edge is defined as one which is integral with the main body of the part having the rigid side or edge and is uninterrupted by clamping or other tightening means.

The "rigid" edge or side forms a reference surface and must not be altered and hence the requirement is that the rigid edge of the female dovetail must be engaged tightly against a rigid edge of the male dovetail. If clamping means are incorporated in an edge of a female dovetail (which is preferred) that edge is opposite a rigid edge and acts to urge the rigid edge of the female dovetail against one of the rigid edges of the male dovetail.

By the expression "dovetail" is meant both the conventional dovetail and a construction in which one side edge is at an acute angle to say the top face and in which the other side face is at right angles to the face.

The dovetails are preferably provided on each of the faces of the capstan and arranged to bear the same spatial relationship with the reference parameters of the machine tool, e.g., the center of the spindle and a plane transverse thereto, so that a tool holder can be mounted at any station for operation with one particular machine tool. If a number of machine tools have been modified to this system then the tools will be interchangeable not only between stations on one machine tool but also between machine tools.

The male dovetail or dovetails may extend along the length of the capstan and transversely across the cross-slides of a multispindle lathe and may also extend either vertically or horizontally across the face of the turret of a turret lathe as well as extending across the cross-slides.

Once the tool has been preset it is mounted on a dovetail on the machine tool and slid along the dovetail up to a stop. The clamp means on the tool is then tightened thus holding the rigid side of the female dovetail against one of the edges of the male dovetail on the machine tool.

The invention extends not only to a machine tool having male dovetails members formed on its tool carrier portions, namely on the cross-slides, turret and/or capstans, but also to a method of converting a machine tool to make it suitable for use with preset tools comprising the steps of machining a slot in a tool carrying face, fixing a male dovetail member in the slot in such a position that it bears a predetermined spatial relationship with known parameters of the machine tool, for example the centerline of the chuck or, in the case of a multispindle machine tool, to the mean centerline of the spindles.

The male dovetail member may conveniently be located in the slot by means of a cam mechanism comprising a number of eccentrics operated by screws and spaced apart along the length of the dovetail member on either side of it. A nitrided steel is found to be the most suitable material for the male dovetail due to its negligible deformation on heat treatment.

As mentioned above the male dovetail member is advantageously provided with a number of stops or stop members spaced apart along its length at known positions relative to a parameter of the machine tool such as the face of the spindle or chuck face or the parting-off line.

The invention will now be further described by way of example with reference to the accompanying drawings in which:

FIG. 2 is an end elevation of part of a capstan of a multispindle lathe; and

Figure 1:
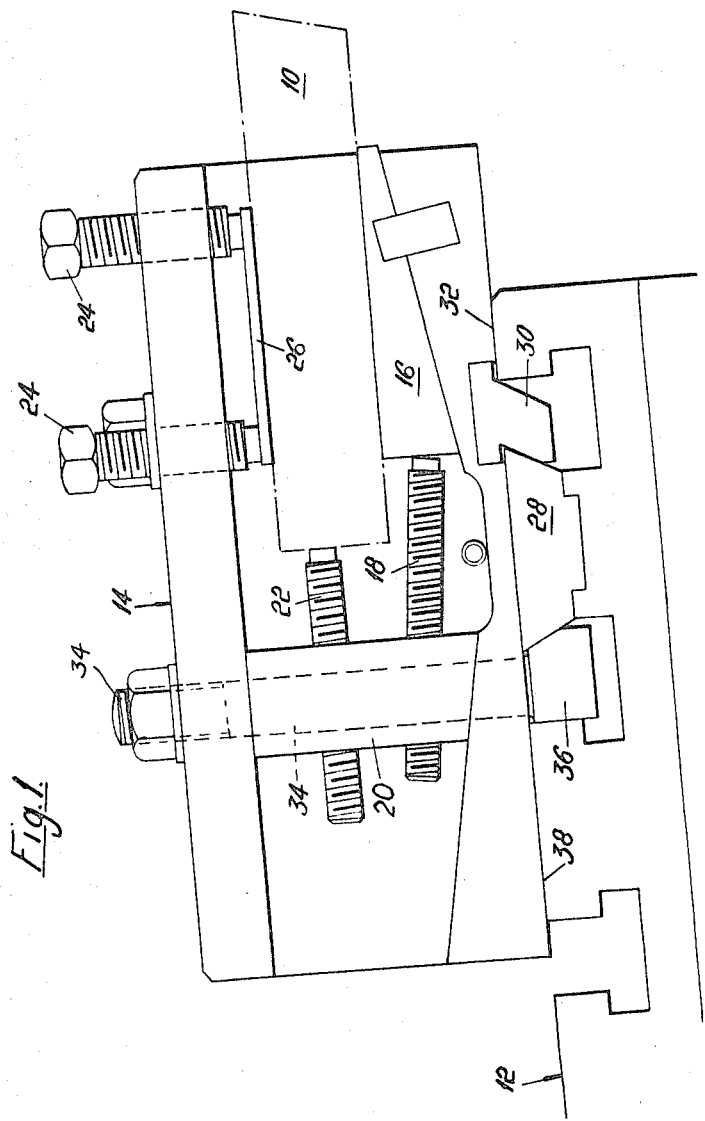
FIG. 1 is a side elevation of a cross-slide of a machine tool.

FIGS. 3a, b and c show a method of conversion of an existing tool slot to a dovetail arrangement suitable for preset tooling.

FIG. 1 shows a tool 10 (in dotted lines) mounted on the cross-slide 12 of a machine tool by means of a tool holder 14.

The tool 10 is set in a predetermined position remote from the machine tool either by mounting it on a dummy cross-slide or on a special location jig.

The position of the tool 10 in the tool holder 14 is determined by a wedge member 16 which is used to adjust the height of the tool on adjustment of a screw 18 mounted in a pillar 20 and a screw stop 22 also mounted in the pillar 20. The tool 10 after being set in a position which is determined by measuring its distance from two or three known reference planes, i.e., the lower surface 32, one edge of the dovetail member and an end stop, is clamped by means of two clamping screws 24 which engage on a shim 26 next to the tool.

When the tool holder is mounted on the cross-slide the reference surfaces on the tool holder are at known distance from the reference surfaces on the cross-slide which are at a known distance from the parameters of the machine tool such as the centerline of the chuck or the mean centerline of the spindles of a multispindle lathe and the parting-off line or the face of the chuck or the spindle drum respectively. Hence, the tool will be at a predetermined distance from these parameters and hence from a workpiece in the chuck.

The tool holder 14 is positively located on the cross-slide by means of a dovetail connection of which the male portion 28 is permanently secured to the cross-slide as described below (with reference to FIG. 3) and the female portion is provided on the tool holder.

The female portion of the dovetail comprises a hardened insert 30 let into the lower surface 32 of the tool holder and designed to engage one side of the male dovetail and a clamping member in the form of a bolt 34 having a head 36, one side of which is machined to form an inclined surface to engage the other side of the male dovetail. As the bolt 34 is tightened it urges the under surface of the tool holder against the surface 38 of the cross-slide, and in addition the insert 30 is forced against the other side of the male member.

In order to make it possible to preset the tool in the tool holder so that on mounting it on the machine tool it assumes a predetermined position within a tolerance of 2/10,000 inch the surface 38 of the cross-slide, the surface of the tool holder and both surfaces of the male portion of the dovetail are very accurately machined to form "rigid" edges or surfaces which act as reference surfaces. Positioning along the slide is effected by adjustment of an end stop which engages against one of the buttons 70 shown in FIG. 3c.

In FIG. 2 a preset tool 10 (in dotted lines) is mounted on the capstan 50 of a multispindle lathe by means of a tool holder 14. The tool 10 is arranged to machine a workpiece rotating in a spindle whose centerline is indicated by III.

The capstan 50 has been adapted for preset tooling by the addition of a male dovetail portion which receives a female portion on the tool holder 14. The tool holder 14 is set up on the capstan 50 similarly to the setting up of the tool holder 14 on the cross-slide 12 (see FIG. 1).

FIG. 3a shows a conventional tool clamping means on a cross-slide or capstan which comprises two slots 60 having overhanging edges 62. In order to adapt the cross-slide or capstan for preset tooling the heavily shaded portion 64 which separates the two slots is removed by a machining process to form an accurate recess 66. The base of a male dovetail portion 28 (see FIG. 3c) is then laid in the recess with a small clearance between its sides and the sides of the recess. The dovetail portion 28 is then positioned at a predetermined spatial relationship relative to a predetermined line or plane such as the centerline of the chuck or mean centerline of the spindles in the case of a multispindle lathe. The accurate positioning is effected by means of several pairs of eccentrics 68, one eccentric of each pair being on either side of the dovetail portion and the pairs being spaced apart along the length of the dovetail portion 28 (see FIG. 3b). When the dovetail portion is exactly in position the eccentrics are locked by grub screws 69 and then bolted firmly to the cross-slide of the capstan.

Stop members 70 (FIG. 3c) conveniently may be provided at, say 1 inch, intervals on the upper side of the dovetail portion, preferably in a groove 72. The stops are engaged by a tongue 74 mounted for longitudinal adjustment on a screw thread 76 provided on the tool holder and effect the positioning of the tool holder along the dovetail. The position of each of the stop members may advantageously be related to some known plane such as the part-off line of the face of the chuck or drum.

We claim:

1. For use in machine tools, the combination comprising: a portable tool holder for preset tool mounting comprising transversely related first and second reference surfaces, and means for mounting tools therein such that the work-engaging edges thereof are adjustable in two transverse directions and spatially set in predetermined relation to both said reference surfaces; tool carrier means on the machine tool for mounting said holder having a third reference surface, interengageable with said first reference surface in operation and provided with an elongated recess formed inwardly thereof; means for detachably interconnecting said holder and carrier means comprising an elongated male dovetail member disposed wholly within said recess, beneath said third surface; said member having one rigid side formed along one longitudinal edge thereof, comprising a reference plane, and a second rigid side extending along the opposite longitudinal edge thereof comprising a planar surface divergent to said plane; a single female dovetail member fixed on said holder and having a rigid side comprising said second reference surface formed on a portion thereof depending from said first reference surface and adapted to enter said recess adjacent said one side of said male member in operation; detachable clamping means mountable between said holder and carrier means to extend substantially normal to said first and third reference surfaces and comprising an inclined portion underengageable with said divergently related surface of said male member, and cooperating means for forcing said inclined portion against said divergently related surface whereby to effect close fitting interfacial engagement between said first and third reference surfaces and clamp said second reference surface into close fitting engagement with said reference plane thereby to detachably interlock said holder on said carrier means; and stop means for locating said holder at predetermined selected positions along the length of said male member whereby to position the work-engaging edges of the tools in preselected three-dimensional spatial positions.

2. The combination of claim 1, wherein said male dovetail member is removably mounted in said recess between parallel spaced walls formed at right angles to said third reference surface and comprising lateral limits of an elongated groove portion of said recess.

3. The combination of claim 2, and means for locating said male member in said groove portion comprising plural rotatable eccentrics carried by said male member and engageable with said spaced walls for adjustably locating said male member in said groove, and means for locking the same between said walls thereof.

4. The combination of claim 1, said stop means including fixed stop means carried by said male member at spaced locations therealong for selected engagement by adjustable stop means mounted on said holder whereby the latter may be locked to said carrier means at selected locations along the longitudinal axis of said male member and said work-engaging edges located in predetermined three-dimensional locations relative to reference parameters of the machine tool.